US010400870B2

(12) United States Patent
Crump et al.

(10) Patent No.: US 10,400,870 B2
(45) Date of Patent: Sep. 3, 2019

(54) VALVULAR PATHS

(71) Applicant: BorgWarner Inc., Auburn Hills, MI (US)

(72) Inventors: Matthew W. Crump, Cortland, NY (US); Keith B. Cobb, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 246 days.

(21) Appl. No.: 15/520,456

(22) PCT Filed: Oct. 14, 2015

(86) PCT No.: PCT/US2015/055431
§ 371 (c)(1),
(2) Date: Apr. 20, 2017

(87) PCT Pub. No.: WO2016/069262
PCT Pub. Date: May 6, 2016

(65) Prior Publication Data

US 2017/0321785 A1 Nov. 9, 2017

Related U.S. Application Data

(60) Provisional application No. 62/072,170, filed on Oct. 29, 2014.

(51) Int. Cl.
*F01L 1/02* (2006.01)
*F16H 7/08* (2006.01)
(Continued)

(52) U.S. Cl.
CPC ................ *F16H 7/08* (2013.01); *F01L 1/022* (2013.01); *F01L 1/348* (2013.01); *F16H 7/0834* (2013.01);
(Continued)

(58) Field of Classification Search
CPC ..... F16H 2007/0806; F16H 2007/0859; F16H 2007/0812; F16H 7/0848; F16H 2007/0891
(Continued)

(56) References Cited

U.S. PATENT DOCUMENTS 1,329,559 A * 2/1920 Tesla ......................... F15C 1/00 137/842
4,963,121 A * 10/1990 Himura ..................... F16H 7/08 474/110
(Continued)

FOREIGN PATENT DOCUMENTS

EP 1411271 A2 4/2004
JP 2003278859 A 10/2003

OTHER PUBLICATIONS

International Search Report and Written Opinion; dated Jan. 7, 2016; for International Application No. PCT/US2015/055431; 12 pages.
(Continued)

*Primary Examiner* — Henry Y Liu
(74) *Attorney, Agent, or Firm* — BrooksGroup

(57) ABSTRACT

A product for applying tension is disclosed. A block may have a first passage opening into the block. A body may have a first manifold and may be positioned against the block so that the first passage is open to the first manifold. The body may have a flow path for providing fluid from the first manifold to a second manifold and there through to a pressure chamber. The flow path may include a series of channels and may be configured to allow substantially unimpeded flow from the first manifold to the second manifold, and to impede flow from the second manifold to the first manifold. The flow path may be free of movable components.

10 Claims, 3 Drawing Sheets

(51) Int. Cl.
*F16H 7/12* (2006.01)
*F01L 1/348* (2006.01)

(52) U.S. Cl.
CPC ....... *F16H 7/12* (2013.01); *F16H 2007/0806* (2013.01); *F16H 2007/0812* (2013.01); *F16H 2007/0859* (2013.01); *F16H 2007/0891* (2013.01)

(58) Field of Classification Search
USPC .......................................................... 474/110
See application file for complete search history.

(56) References Cited

U.S. PATENT DOCUMENTS

| | | | | | |
|---|---|---|---|---|---|
| 5,090,946 | A * | 2/1992 | Futami | F16H 7/08 | 474/104 |
| 5,277,664 | A * | 1/1994 | Mott | F16H 7/0848 | 474/110 |
| 5,346,436 | A * | 9/1994 | Hunter | F16H 7/0848 | 474/110 |
| 5,512,019 | A * | 4/1996 | Shimaya | F16H 7/08 | 474/110 |
| 5,577,970 | A * | 11/1996 | Smith | F16H 7/0848 | 474/110 |
| 5,643,117 | A * | 7/1997 | Dembosky | F16H 7/0848 | 474/110 |
| 5,935,031 | A * | 8/1999 | Tada | F15B 21/044 | 474/101 |
| 5,954,159 | A * | 9/1999 | Nakamura | F01L 1/02 | 184/11.2 |
| 5,967,920 | A * | 10/1999 | Dembosky | F01L 1/02 | 474/109 |
| 5,967,921 | A * | 10/1999 | Simpson | F16H 7/08 | 474/110 |
| 6,196,939 | B1 * | 3/2001 | Simpson | F16H 7/0848 | 474/101 |
| 6,352,487 | B1 * | 3/2002 | Tada | F01L 1/02 | 474/110 |
| 6,358,168 | B1 * | 3/2002 | Tada | F16H 7/08 | 474/101 |
| 6,435,993 | B1 * | 8/2002 | Tada | F16H 7/0836 | 474/109 |
| 6,810,907 | B2 * | 11/2004 | Hashimoto | F16H 7/0848 | 137/514.5 |
| 6,866,601 | B2 * | 3/2005 | Saitoh | F16H 7/0836 | 474/109 |
| 6,875,141 | B2 * | 4/2005 | Konishi | F16H 7/0836 | 474/101 |
| 7,540,816 | B2 * | 6/2009 | Yoshida | F16H 7/0848 | 474/110 |
| 8,202,184 | B2 * | 6/2012 | Koch | F16H 7/0848 | 184/15.1 |
| 8,951,154 | B2 * | 2/2015 | Konuma | F16H 7/0848 | 474/110 |
| 9,915,323 | B2 * | 3/2018 | Yoshida | F16H 7/08 | |
| 10,024,401 | B2 * | 7/2018 | Kurematsu | F16H 7/08 | |
| 10,208,838 | B2 * | 2/2019 | Crump | F16K 15/00 | |
| 2012/0135831 | A1 * | 5/2012 | Perissinotto | F16H 7/0836 | 474/110 |
| 2012/0322596 | A1 * | 12/2012 | Hofmann | F16H 7/0848 | 474/110 |
| 2013/0178317 | A1 * | 7/2013 | Perissinotto | F16H 7/0836 | 474/110 |
| 2013/0331214 | A1 * | 12/2013 | Crump | F16H 7/0848 | 474/110 |
| 2013/0337954 | A1 * | 12/2013 | Bauer | F16H 7/0836 | 474/110 |
| 2016/0186838 | A1 * | 6/2016 | Kurematsu | F16H 7/08 | 474/110 |

OTHER PUBLICATIONS

Chinese Office Action dated Dec. 3, 2018 ; Application No. 201580055234.9; Applicant: BorgWarner Inc.; 9 pages.
Japanese Office Action dated May 28, 2019; Application No. 2017-519280; Applicant: BorgWarner Inc.; 6 pages.

* cited by examiner

VALVULAR PATHS

CROSS-REFERENCE TO RELATED APPLICATIONS

This application claims the benefit of U.S. Provisional Application No. 62/072,170 filed Oct. 29, 2014.

TECHNICAL FIELD

The field to which the disclosure generally relates includes valves and more particularly, to check valves that allow free flow in one direction and impede flow in the other direction.

BACKGROUND

Hydraulic automatic tensioners use pressure to remove slack and dampen vibrations such as those occurring in an engine's timing chain or belt as it moves between adjacent sprockets or pulleys. Timing chain tension may be automatically adjusted to engine speed and vibration generation by the flow of hydraulic fluid into, and out of, the tensioner.

SUMMARY OF ILLUSTRATIVE VARIATIONS

A product for applying tension may be provided according to a number of variations, wherein a block may have a first passage opening into the block. A body may have a first manifold and may be positioned against the block so that the first passage is open to the first manifold. The body may have a flow path for providing fluid from the first manifold to a second manifold and there through to a pressure chamber. The flow path may include a series of channels and may be configured to allow substantially unimpeded flow from the first manifold to the second manifold, and to impede flow from the second manifold to the first manifold. The flow path may be free of movable components.

According to a number of other variations a hydraulic tensioner for applying force to a component of an engine may be provided. A body may have a piston bore, a first manifold, and a second manifold. A piston may be slidably disposed in the piston bore so as to define a first chamber in the piston bore between the body and the piston. A first passage in the body may extend between the piston bore and the second manifold. A second passage in the engine may be in fluid communication with the first manifold. A plurality of flow channels may extend between the first manifold and the second manifold. The flow channels may be configured to allow substantially unimpeded flow from the first manifold to the second manifold, and to impede flow from the second manifold to the first manifold. The flow channels may be free of movable components.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
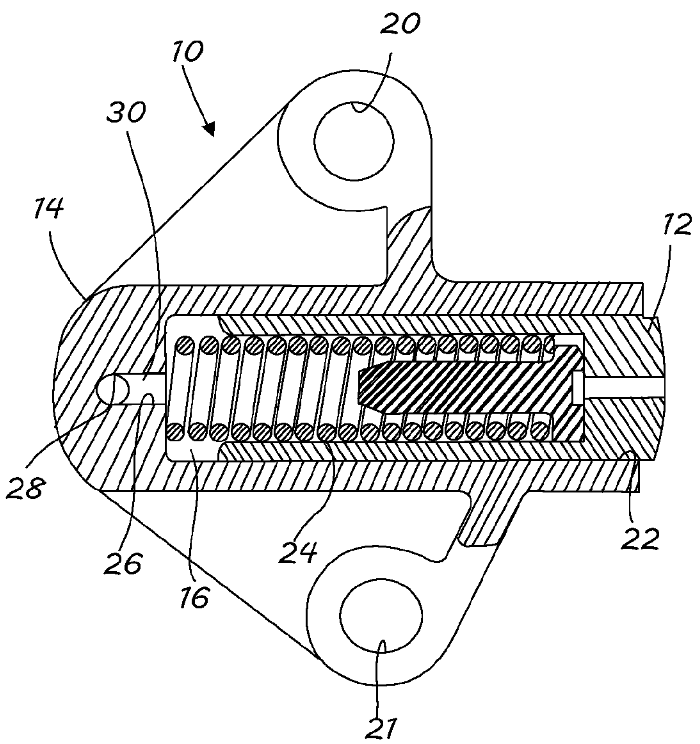
FIG. 1 is a partial cross sectional view of a hydraulic tensioner according to a number of variations.

In an internal combustion engine a linking element such as a chain or belt may play a part in synchronizing the action of the various valves. To maintain the desired tension on the linking element, a hydraulic tensioner 10 as illustrated in FIG. 1 may be used. A tensioner guide (not illustrated), may be provided, upon which the linking element slides and which may be forced toward the linking element to remove slack by applying tension as a result of a force applied by a piston 12 of the tensioner 10.

A housing or body 14 of the tensioner 10 may be provided with mounting holes 20 and 21 to fix the tensioner to an engine. A bore 22 may be provided in the body which may have a cylindrical shape to simplify formation with a diameter sized to slidably hold the piston 12. With the piston 12 positioned in the bore 22, a chamber 16 is defined between the body 14 and the piston 12 which may be a pressure chamber to contain hydraulic fluid under pressure. Pressure in the chamber 16 may act to force the piston 12 out of the body 14, and with the body fixed to the associated engine, to apply force to a tensioner guide and a linking element. In addition, a spring 24 is positioned in the bore 22 and biases the piston 12 out of the body 14.

A second bore 26 may be provided at the end of the bore 22 and may be smaller in diameter than the bore 22. The bore 26 may be intersected by a cross bore 28 and together they may form a passage 30 through the body that may be connected to a pressurized fluid supply as will be described later. In response to movement, vibration or slack in the linking element that reduces force on the piston 12, the spring 24 forces the piston 12 out of the body 14 and along with pressure from the fluid supply draws fluid into the chamber 16. To maintain the desired amount of tension on the linking element, the supply of fluid into and through the passage 30 is substantially unrestricted. When tension in the linking element increases, increased force against the piston 12 results, and the piston 12 tends to retract into the body 14. Fluid in the chamber 16 resists retraction of the piston 12. To inhibit excessive retraction and to maintain the desired tension, flow through the passage 30 may be restricted or impeded as will be described in relation to FIG. 2.

Figure 2:
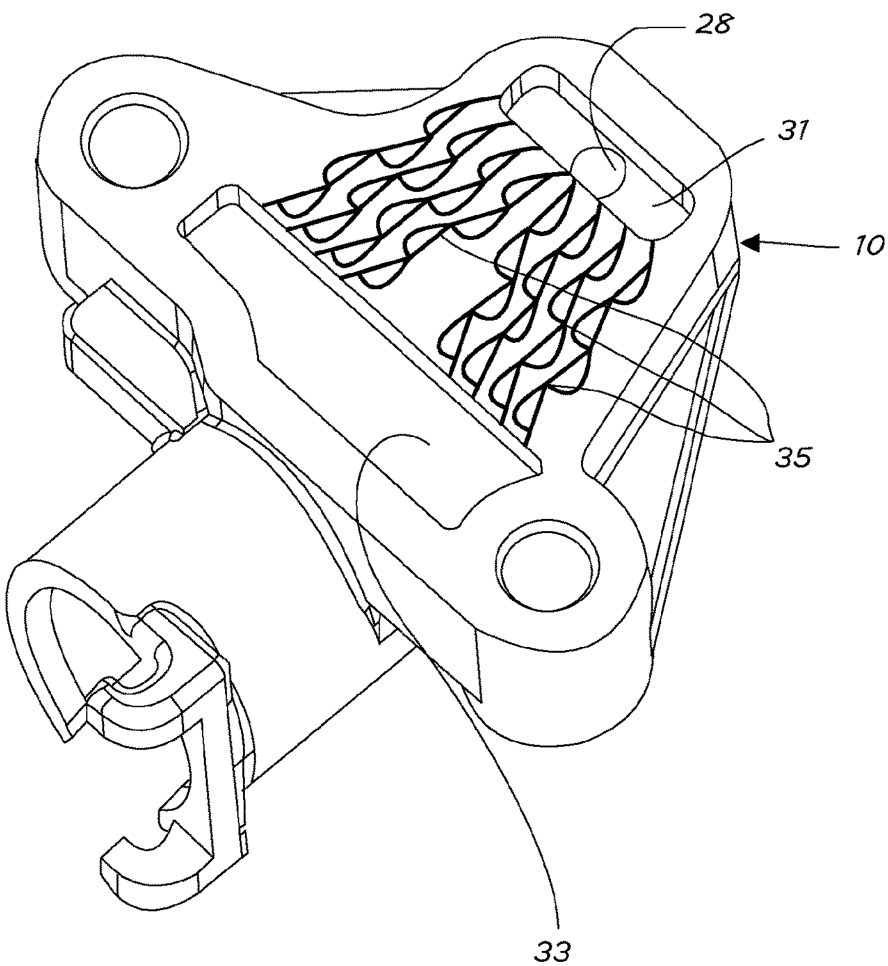
FIG. 2 is a schematic isometric view of a hydraulic tensioner according to a number of variations.

Referring to FIG. 2, the hydraulic tensioner 10 includes a first cavity in its body 14 forming a manifold 31 into which the bore 28 opens. Spaced apart from the manifold 31 is another cavity forming the manifold 33 in the body 14 of the hydraulic tensioner 10. Between the manifolds 31 and 33 a number of valvular paths 35 are formed in the body 14. Fluid and fluid pressure are communicated substantially unimpeded from the manifold 33 to the manifold 31 through the valvular paths 35. Fluid and fluid pressure transmission from the manifold 31 to the manifold 33 is impeded by the valvular paths 35.

Figure 3:
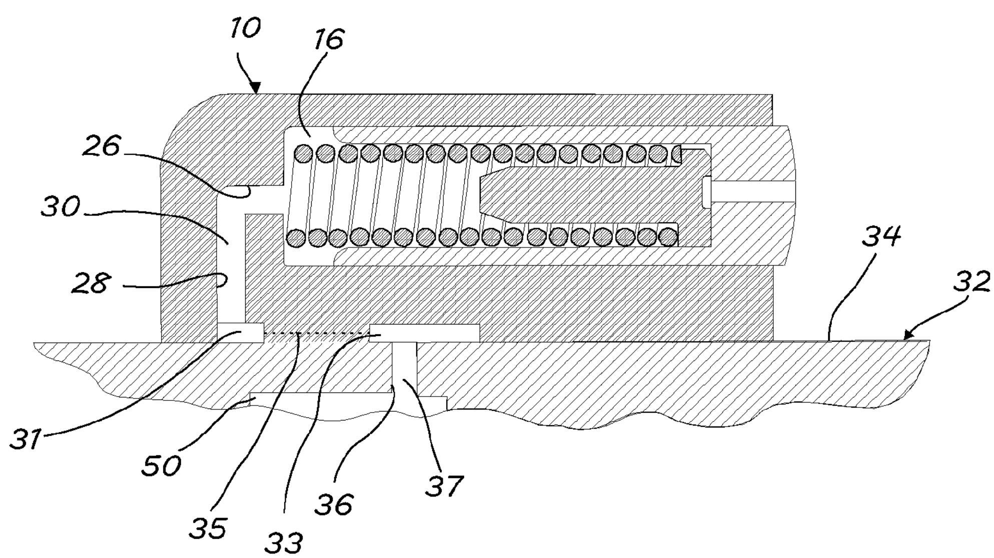
FIG. 3 is a fragmentary cross sectional view of a hydraulic tensioner positioned against an engine block according to a number of variations.

Referring to FIG. 3, the fluid route between the pressurized fluid supply chamber 50 in the block 34 of the engine 32 and the pressure chamber 16 is visible. The passage 30 in the body 14 includes the bore 26 and the bore 28 and extends between the pressure chamber 16 and the manifold 31. The valvular paths 35 in the body 14 extend between the manifold 31 and the manifold 33. The manifold 33 is open through the passage 37 provided by the bore 36 to the pressurized fluid supply chamber 50. Fluid and fluid pressure may be communicated from the pressurized fluid supply chamber 50 to the pressure chamber 16 through the passage 37 (bore 36), the manifold 33, the valvular paths 35, the manifold 31, and the passage 30 (bores 28, 26). Fluid and fluid pressure may be communicated from the pressure chamber 16 to the pressurized fluid supply chamber 50 through the passage 30 (bores 26, 28), the manifold 31, the valvular paths 35, the manifold 33, and the passage 37 (bore 36).

The communication or flow of fluid and fluid pressure from the manifold 33 to the manifold 31 is substantially unimpeded in the forward direction from the pressurized fluid supply chamber 50 to the pressure chamber 16 due to the configuration of the valvular paths 35; and is impeded in the reverse direction from the pressure chamber 16 to the pressurized fluid supply chamber 50 due to the configuration of the valvular paths 35, which causes backpressure.

Figure 4:
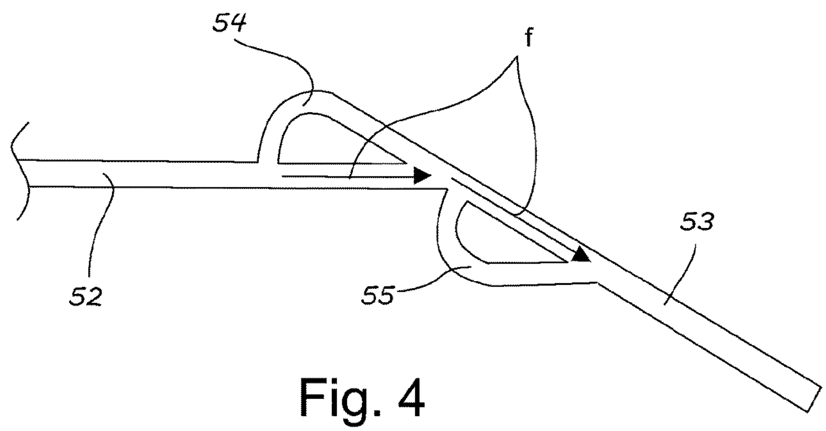
FIG. 4 is a schematic representation of part of a flow path of a hydraulic tensioner according to a number of variations.
Figure 5:
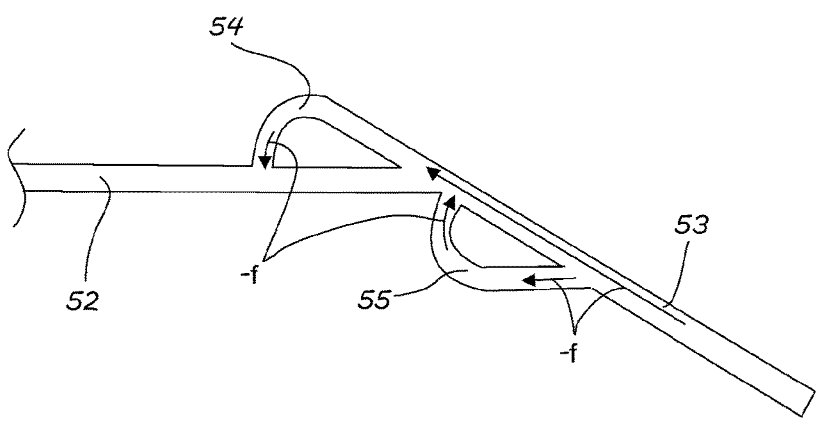
FIG. 5 is a schematic representation of part of a flow path of a hydraulic tensioner according to a number of variations.

As depicted in FIG. 4, the valvular paths include straight channels 52 and 53 and semi-circular channels 54 and 55. This configuration of channels may be repeated in series a number of times between the manifolds 31 and 33. Forward flow f, through the valvular paths 35 moves relatively freely in the forward direction by avoiding the semi-circular channels 54, 55 and proceeding through the straight channel 52 and the straight channel 53. As depicted in FIG. 5, reverse flow −f, through the valvular paths is impeded. Reverse flow −f has a tendency to enter the semi-circular channels 54 and 55 interrupting flow through the straight channels 53, 52. More specifically, part of the flow through the straight channel 53 splits into the semi-circular channel 55 and reenters the straight channel 53 at a perpendicular direction relative to the straight channel 53 interrupting flow there through. Continuing, part of the flow enters the semi-circular channel 54 and reenters at a perpendicular direction into the side of the straight channel 52 interrupting flow there through. Through this structure fluid and fluid pressure is provided from the pressurized fluid supply chamber 50 to the pressure chamber 16 substantially unimpeded and fluid and fluid pressure is impeded from the pressure chamber 16 to the pressurized fluid supply chamber 50 without the use of mechanical check valves or other movable elements. Without moving parts, construction is simplified and the wear and fatigue of moving parts may be avoided.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may include a product for applying tension. A block may have a first passage opening into the block. A body may have a first manifold and may be positioned against the block so that the first passage is open to the first manifold. The body may have a flow path for providing fluid from the first manifold to a second manifold and there through to a pressure chamber. The flow path may include a series of channels and may be configured to allow substantially unimpeded flow from the first manifold to the second manifold, and to impede flow from the second manifold to the first manifold. The flow path may be free of movable components.

Variation 2 may include a product according to variation 1 with a piston slidably disposed in the body. The pressure chamber may be formed between the body and the piston so that fluid supplied from the first passage enters the pressure chamber as the piston slides out of the body.

Variation 3 may include a product according to variation 1 or 2 wherein the series of channels include a series of straight segments and semi-circular segments. Flow may be substantially unimpeded in a first direction through the series of straight segments and flow is interrupted by the semi-circular segments in a second direction.

Variation 4 may include a product according to variation 3 wherein each semi-circular segment connects between an end of a first straight segment and a side of a second straight segment.

Variation 5 may include a product according to variation 4 wherein the semi-circular segment connects to the side of the second straight segment so that flow enters the second straight segment from the semi-circular segment substantially perpendicular to the second straight segment.

Variation 6 may include a hydraulic tensioner for applying force to a component of an engine may be provided. A body may have a piston bore, a first manifold, and a second manifold. A piston may be slidably disposed in the piston bore so as to define a first chamber in the piston bore between the body and the piston. A first passage in the body may extend between the piston bore and the second manifold. A second passage in the engine may be in fluid communication with the first manifold. A plurality of flow channels may extend between the first manifold and the second manifold. The flow channels may be configured to allow substantially unimpeded flow from the first manifold to the second manifold, and to impede flow from the second manifold to the first manifold. The flow channels may be free of movable components.

Variation 7 may include a hydraulic tensioner according to variation 6 wherein the second passage may be connected to a source of pressurized fluid in the engine. The hydraulic tensioner may be configured so that pressurized fluid supplied from the second passage passes through the flow channels to the first chamber and as the piston slides out of the body.

Variation 8 may include a hydraulic tensioner according to variation 6 or 7 wherein the flow channels may each comprise a series of straight segments and semi-circular segments. Flow may be substantially unimpeded in a first direction through the series of straight segments and flow may be interrupted by the semi-circular segments in a second direction.

Variation 9 may include a hydraulic tensioner according to variation 8 wherein each semi-circular segment connects between an end of a first straight segment and a side of a second straight segment.

Variation 10 may include a hydraulic tensioner according to variation 9 wherein the semi-circular segment connects to the side of the second straight segment so that flow enters the second straight segment from the semi-circular segment substantially perpendicular to the second straight segment.

The above description of select variations within the scope of the invention is merely illustrative in nature and, thus, variations or variants thereof are not to be regarded as a departure from the spirit and scope of the invention.

What is claimed is:

1. A product for applying tension comprising: a block with a first passage opening into the block; a body having a first manifold, the body positioned against the block so that the first passage is open to the first manifold; the body having a flow path for providing fluid from the first manifold to a second manifold and through the second manifold to a pressure chamber; wherein the flow path includes a series of channels and is configured to allow substantially unimpeded flow from the first manifold to the second manifold; and wherein the flow path is configured to impede flow from the second manifold to the first manifold; and wherein the flow path is free of movable components.

2. The product according to claim 1 further comprising a piston slidably disposed in the body wherein the pressure chamber is formed between the body and the piston so that fluid supplied from the first passage enters the pressure chamber as the piston slides out of the body.

3. The product according to claim 2 wherein the series of channels comprise a series of straight segments and semi-circular segments; and wherein flow is substantially unimpeded in a first direction through the series of straight segments and flow is interrupted by the semi-circular segments in a second direction.

4. The product according to claim 3 wherein each semi-circular segment connects between an end of a first straight segment and a side of a second straight segment.

5. The product according to claim 4 wherein each semi-circular segment connects to the side of the second straight segment so that flow enters the second straight segment from the semi-circular segment substantially perpendicular to the second straight segment.

6. A hydraulic tensioner for applying force to a component of an engine comprising: a body having a piston bore, a first manifold, and a second manifold; a piston slidably disposed in the piston bore defining a first chamber in the piston bore between the body and the piston; a first passage in the body extending between the piston bore and the second manifold; a second passage in the engine that is in fluid communication with the first manifold; a plurality of flow channels between the first manifold and the second manifold; wherein the flow channels are configured to allow substantially unimpeded flow from the first manifold to the second manifold and the flow channels are configured to impede flow from the second manifold to the first manifold and wherein the flow channels are free of movable components.

7. The hydraulic tensioner according to claim 6 wherein the second passage is connected to a source of pressurized fluid in the engine, wherein the product is configured so that pressurized fluid supplied from the second passage, passes through the flow channels to the first chamber as the piston slides out of the body.

8. The hydraulic tensioner according to claim 7 wherein the flow channels each comprise a series of straight segments and semi-circular segments and wherein flow is substantially unimpeded in a first direction through the series of straight segments and flow is interrupted by the semi-circular segments in a second direction.

9. The hydraulic tensioner according to claim 8 wherein each semi-circular segment connects between an end of a first straight segment and a side of a second straight segment.

10. The hydraulic tensioner according to claim 9 wherein each semi-circular segment connects to the side of the second straight segment so that flow enters the second straight segment from the semi-circular segment substantially perpendicular to the second straight segment.

* * * * *